(12) United States Patent
Whitelaw

(10) Patent No.: US 11,983,958 B2
(45) Date of Patent: May 14, 2024

(54) SYSTEMS AND METHODS FOR AUTOMATED MAKEUP APPLICATION

(71) Applicant: Gemma Robotics Inc., Haifa (IL)

(72) Inventor: Elizabeth Whitelaw, Dallas, TX (US)

(73) Assignee: Gemma Robotics, Inc., Haifa (IL)

( * ) Notice: Subject to any disclaimer, the term of this patent is extended or adjusted under 35 U.S.C. 154(b) by 0 days.

(21) Appl. No.: 18/093,682

(22) Filed: Jan. 5, 2023

(65) Prior Publication Data

US 2023/0147029 A1 May 11, 2023

Related U.S. Application Data

(63) Continuation of application No. 16/296,159, filed on Mar. 7, 2019, now Pat. No. 11,568,675.

(51) Int. Cl.

| | |
|---|---|
| *G06V 40/16* | (2022.01) |
| *A45D 33/34* | (2006.01) |
| *A45D 34/04* | (2006.01) |
| *A45D 44/00* | (2006.01) |
| *B25J 9/00* | (2006.01) |
| *B25J 9/16* | (2006.01) |

(52) U.S. Cl.
CPC ........... *G06V 40/168* (2022.01); *A45D 33/34* (2013.01); *A45D 34/04* (2013.01); *A45D 44/005* (2013.01); *B25J 9/0003* (2013.01); *B25J 9/1697* (2013.01); *G06V 40/172* (2022.01); *A45D 2044/007* (2013.01)

(58) Field of Classification Search
CPC .... G06V 40/168; G06V 40/172; A45D 33/34; A45D 34/04; A45D 44/005; A45D 2044/007; B25J 9/0003; B25J 9/1697; B25J 19/023; B25J 11/008

USPC ......................................................... 434/100
See application file for complete search history.

(56) References Cited

U.S. PATENT DOCUMENTS

| | | | |
|---|---|---|---|
| 4,864,966 A | 9/1989 | Anderson et al. | |
| 4,904,148 A | 2/1990 | Larsson | |

(Continued)

FOREIGN PATENT DOCUMENTS

| | | | | |
|---|---|---|---|---|
| CN | 106778829 | * | 4/2019 | ............ G06F 18/23 |
| JP | 2011022733 | * | 2/2011 | |
| JP | 2014113445 | * | 11/2015 | ........... A45D 44/005 |

OTHER PUBLICATIONS

Non-final Office Action issued by the United States Patent Office for U.S. Appl. No. 16/296,159, dated May 11, 2022.

*Primary Examiner* — Jerome Grant, II
(74) *Attorney, Agent, or Firm* — Barnes & Thornburg LLP

(57) ABSTRACT

Systems and methods for automated makeup application allow a user to select and apply desired makeup styles to the user's face. The systems and methods include a computer application with a graphical user interface which allows selection of a look from a plurality of preconfigured looks. A camera coupled with a robotic arm records a face map and color coding and sends that data to be stored on a virtual server database. The application calculates formula quantity and a pump extracts desired formula amounts from appropriate formula cartridges which it releases into reservoirs on the robotic arm's head. An airbrush compressor mixes the formula and plug triggers release one of several airbrush nozzles to start spraying the user's face with formula. A cleaning mechanism is provided between makeup applications and after the final application.

22 Claims, 8 Drawing Sheets

(56) References Cited

U.S. PATENT DOCUMENTS

| | | |
|---|---|---|
| 6,801,216 B2 | 10/2004 | Voticky et al. |
| 7,106,343 B1 | 9/2006 | Hickman |
| 7,967,549 B2 | 6/2011 | Geist et al. |
| 8,074,899 B2 | 12/2011 | Mehta |
| 8,091,802 B2 | 1/2012 | Fedorov |
| 8,107,672 B2 | 1/2012 | Goto |
| 8,464,732 B2 | 6/2013 | Wong |
| 9,224,248 B2 | 12/2015 | Ye et al. |
| 2006/0098076 A1 | 5/2006 | Liang |
| 2007/0179665 A1 | 8/2007 | Welch et al. |
| 2012/0158184 A1 | 6/2012 | Ma et al. |
| 2019/0053608 A1* | 2/2019 | Staton ................. B01F 33/8442 |
| 2019/0209984 A1 | 7/2019 | Lubow et al. |

\* cited by examiner

SYSTEMS AND METHODS FOR AUTOMATED MAKEUP APPLICATION

CROSS-REFERENCE TO RELATED APPLICATION

This application is a continuation of U.S. patent application Ser. No. 16/296,159, filed Mar. 7, 2019, the entire contents of which is hereby incorporated by reference herein.

TECHNICAL FIELD

The present disclosure relates to systems and methods for automated makeup application, and more particularly, to systems and methods for applying makeup to a face without continuous human intervention.

BACKGROUND

Applying makeup can be very time consuming, often taking several hours a week. It may also be unhygienic since makeup and brushes are often not cleaned properly after each use, which can lead to acne and infections. Makeup can also be very expensive as a user may purchase multiple products from many different makeup brands, colors and styles to achieve a desired look. Whether a user is applying makeup to oneself or is getting a makeover in a salon, poor color matching often results from the lack of available foundation shades. Despite the identification of over 100 skin colors, most makeup companies only offer less than 40 foundation shades, and even fewer options for women of color. Therefore, imperfect or off-color foundation is a frequent occurrence, and unintentionally discriminates against women of color.

Traditional makeup application methods, products, and implements are relied upon by a cosmetics industry worth many billions of dollars in sales every year. However, there is still a demand for new products and methods to help consumers save time and money and improve their hygiene when applying makeup.

SUMMARY

The present disclosure relates to systems and methods for automated makeup application that allows a user to select a desired makeup style and apply the selected makeup to the user's face. In accordance with the present disclosure, a method for automated makeup application is provided which substantially eliminates or reduces disadvantages and problems associated with previous systems and methods.

In accordance with one aspect of the present disclosure, a method is provided for recording a face map and facial colors of the user; choosing a desired look; calculating formula quantity needed for each makeup category of the selected look; collecting and releasing the formula into a reservoir; mixing the formula; spraying the user's face with formula through an airbrush nozzle; and cleaning the reservoirs and nozzles.

An embodiment of the present disclosure includes a method and system for automated makeup application that allows the user to choose a look from a plurality of preconfigured looks based on personal preference. By automating the makeup application process to achieve an appropriate look, and thereby reducing the need to apply makeup by hand, the system saves time and reduces delays. The system also reduces the time wasted on gathering and preparing various cosmetics by automating the process of calculating formula amounts, collecting formula, and releasing it for application. The system is particularly useful for aiding those that find decisions regarding the selection of an appropriate look, makeup style, and colors difficult or burdensome. Furthermore, the system is especially useful in aiding persons with physical disabilities.

Another important aspect of the present disclosure is the emphasis on personal hygiene of the user. By eliminating the practice of using cosmetics, brushes, and other related implements without properly cleaning them between each use, as is the case in traditional makeup application, the present disclosure protects users from the threat of contracting diseases, germs, and infections.

A further important aspect of the present disclosure is the accuracy in color matching and foundation application. Matching different shades of color from thousands of different brands and colors is a challenging task and requires considerable training and experience to efficiently combine these colors to achieve the desired look manually. By automating this task, the present disclosure accurately applies makeup along the lines of the color template chosen by the user. The system is particularly useful for aiding those that find it difficult to choose the foundation that is appropriate for their skin tone, since the makeup industry does not offer enough foundation shades to match a user's exact skin tone. Further automating this task, the system records a face map which includes the user's facial colors and determines the foundation that is appropriate for the user's skin tone.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Traditional makeup application methods tend to be messy, time-consuming, costly, and unhygienic. The present disclosure is directed to quick, sanitary, and cost-effective systems and methods for makeup application.

The systems and methods of the present disclosure substantially eliminate human intervention in makeup selection, appropriation, application, and cleanup, while performing these tasks accurately, cost-effectively, and in an acceptable hygienic manner.

The present disclosure represents unique systems and methods for applying makeup without substantial or continuous human intervention. One implementation of the present disclosure employs a computer and computer code or software and is capable of operation over the internet when hosted by a cloud-based server.

The present disclosure relates to systems and methods for automated makeup application that allow a user to select a desired makeup style and apply the makeup associated with the selected makeup style to the user's face. Accordingly, the systems and methods of the present disclosure will save users time spent in carrying out the several sub-processes associated with makeup application; (a) gathering various cosmetics, (b) choosing a look to apply to the user's face, (c) choosing the colors required to acquire the look, (d) applying each category of cosmetic, for example, eyeshadow, eyeliner, or lip stick, independently to achieve the desired look based on different formulas of makeup, and (e) cleaning up and putting away the various cosmetics. The present disclosure combines all of these sub-processes into one action as far as the user is concerned, i.e. choosing a look.

The present disclosure serves to make the process of applying makeup more hygienic. A conventional makeup application process employs the use of brushes which come into physical contact with the user's skin. The same brush may be used over a long period of time and it can be very unhygienic because most people don't appropriately clean their makeup and brush after each use. Bacteria can build up over time and cause acne or an even more serious condition, for example, spreading pink eye or other infection due to re-use of makeup that came in contact with a bacteria. The present disclosure employs air brush technology, which eliminates the possibility of contamination caused by unsanitary makeup, cosmetic brushes and other implements.

Furthermore, the present disclosure will substantially eliminate the likelihood of poor color matching and improper foundation application. Perfect color matching and exact application technique are difficult to achieve by a user possessing beginner or intermediate skills in makeup application. Experienced make-up artists charge hundreds of dollars to provide an accurate and desired look. The present disclosure provides users a cost-effective and automated solution by mixing distinct colors to reach a desired shade and applying the right foundation to the appropriate skin tone.

Figure 1:
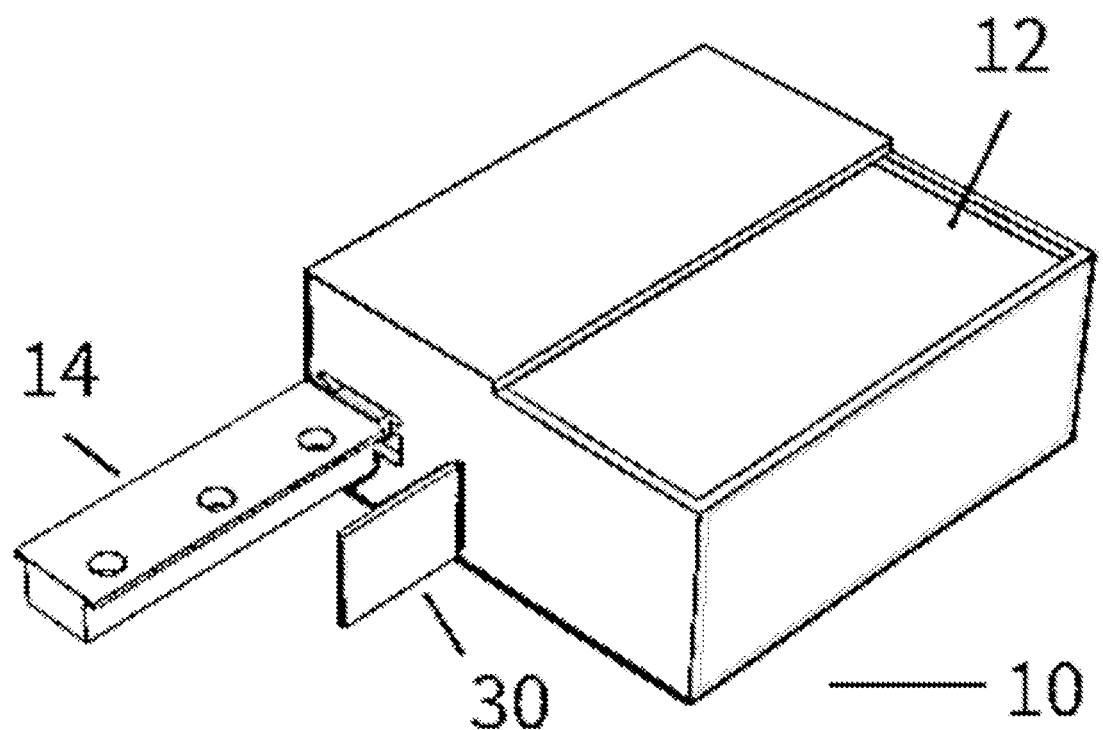
FIG. 1 illustrates a perspective view of an enclosed automated makeup application system and its removable components in accordance with one implementation of the present disclosure.
Figure 2:
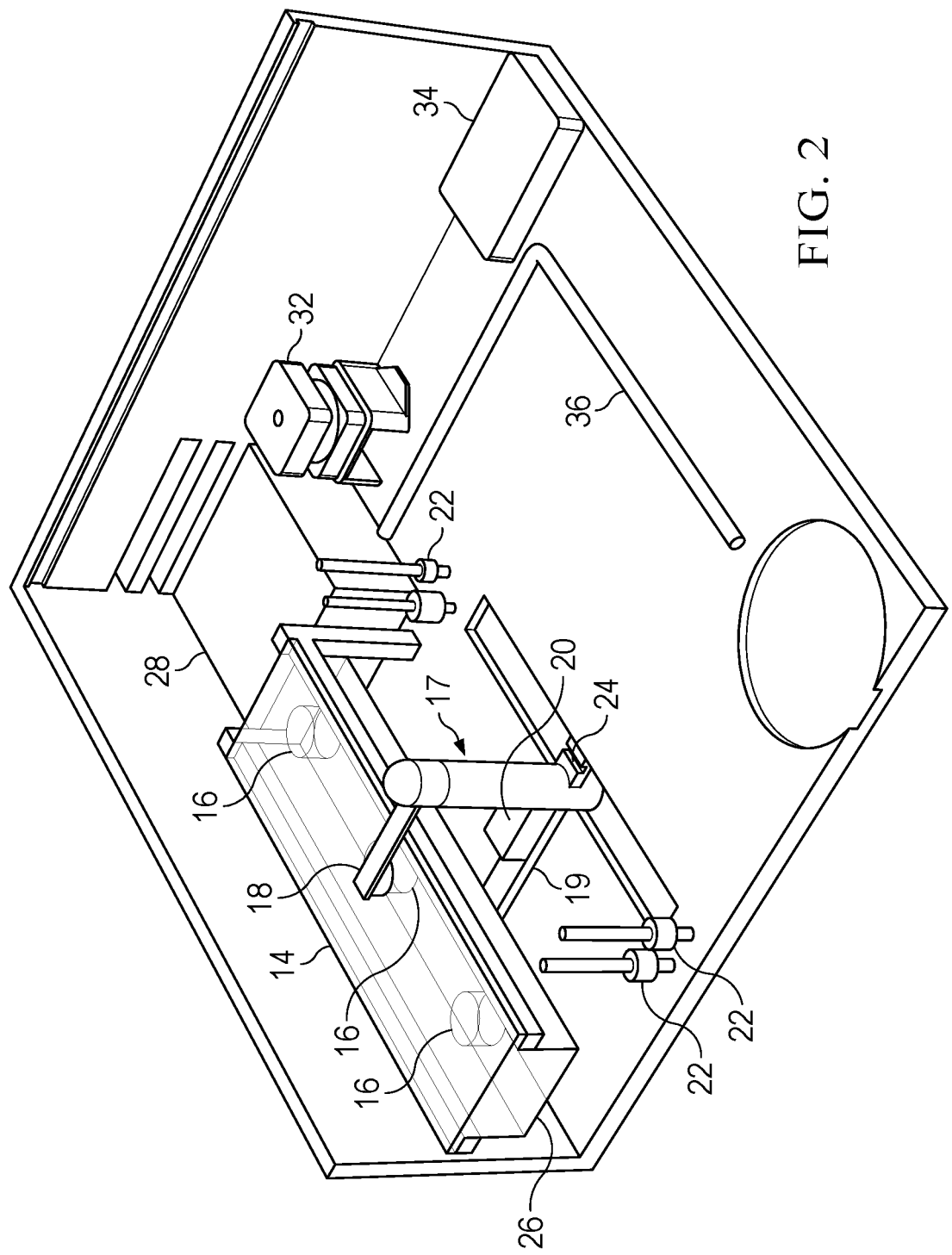
FIG. 2 illustrates a perspective view of various components disposed within the automated makeup application system in accordance with one implementation of the present disclosure.

Referring to FIGS. 1 and 2, in one implementation of the present disclosure, an automated makeup application system 100 comprises a casing 10 with a retractable lid 12, which provides access to the inner contents of the automated makeup application system 100, as shown in FIG. 2. A formula sleeve 14 and a cleaning pad 30 are removable through appropriate slots on the side of casing 10. Formula sleeve 14 is adjacent to a side of casing 10 and comprises a plurality of pods 16 which are used to store formula. A pair of timing pulleys 22 are coupled to the floor of casing 10 and stand vertically on both ends of the formula sleeve 14. A pump/optical sensor module 17 stands vertically next to the formula sleeve 14. The pump/optical sensor module 17 further comprises a pump 18, a cylindrical tube 21, a ledge 19, and an optical sensor 20, as shown in detail in FIG. 3.

The pump/optical sensor module 17 is embedded in a formula track 26 which runs along the length of the formula sleeve 14. The timing pulleys 22 push and pull the pump/optical sensor module 17 with the aid of a belt clamp 24 along the formula track 26. A compressor 28 sits adjacent to the formula sleeve 14 and is used to mix formula. A servo-motor 32 lies adjacent to another side of the compressor 28 and is used to control movement of other components. A microcontroller 34 sits opposite the compressor 28 on the right side of casing 10 and controls various devices and processes. An airbrush compressor hose 36 runs along the floor of casing 10 and connects the compressor 28 to a robotic arm 40, which is illustrated in detail in FIGS. 4 and 5.

Figure 3:
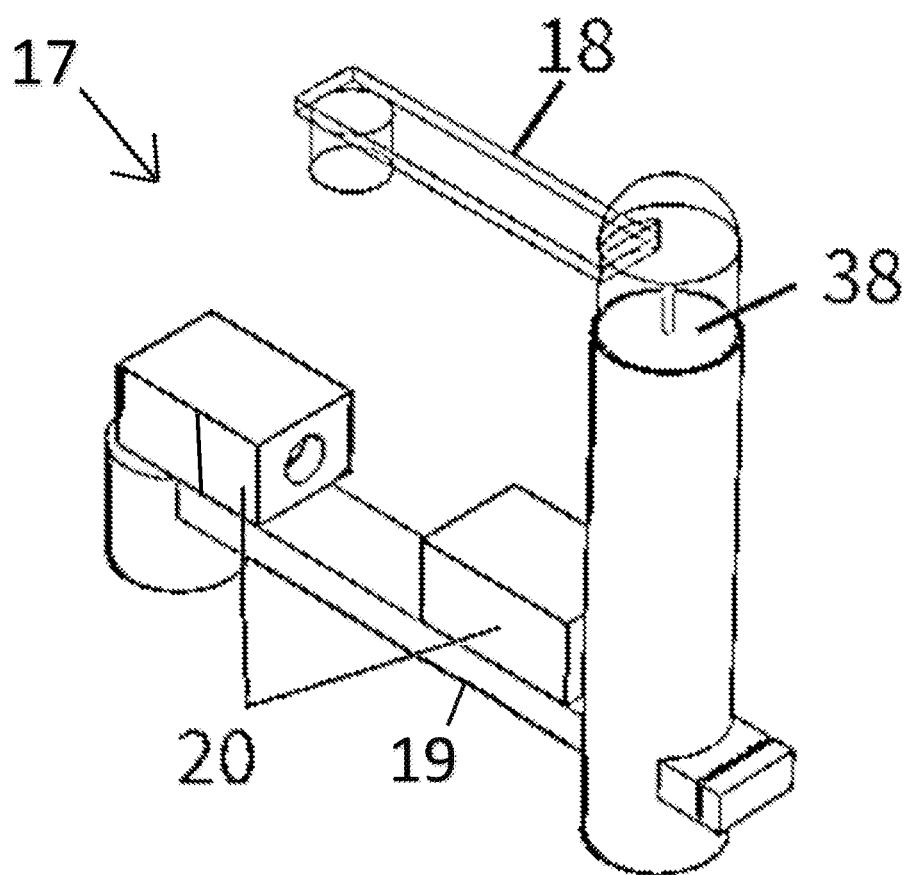
FIG. 3 illustrates an enlarged perspective view of various components of a pump/optic sensor module of the automated makeup application system of FIG. 2, in accordance with one implementation of the present disclosure.

Referring now to FIG. 3, in one implementation of the present disclosure, the pump/optical sensor module 17 comprises a pump 18, a cylindrical tube 21, a ledge 19, and an optical sensor 20. The pump 18 sits at the top of the pump/optical sensor module 17. It hovers over pods 16 and collects required amounts of formula when instructed. A servo-motor 38 is coupled to the pump 18 and controls its movement. The cylindrical tube 21 is coupled to pump 18 at its top end and ledge 19 at its bottom end and helps the pump/optical sensor module 17 stand vertically adjacent to formula sleeve 14. Extending away from cylindrical tube 21, ledge 19 runs below formula sleeve 14, parallel to the floor of casing 10 and pump 18. The ledge 19 is a resting spot for the optical sensor 20 which sits on top of ledge 19 and is right underneath formula sleeve 14. The optical sensor 20 is located underneath formula sleeve 14 and scans pods 16 for available formula.

Figure 4:
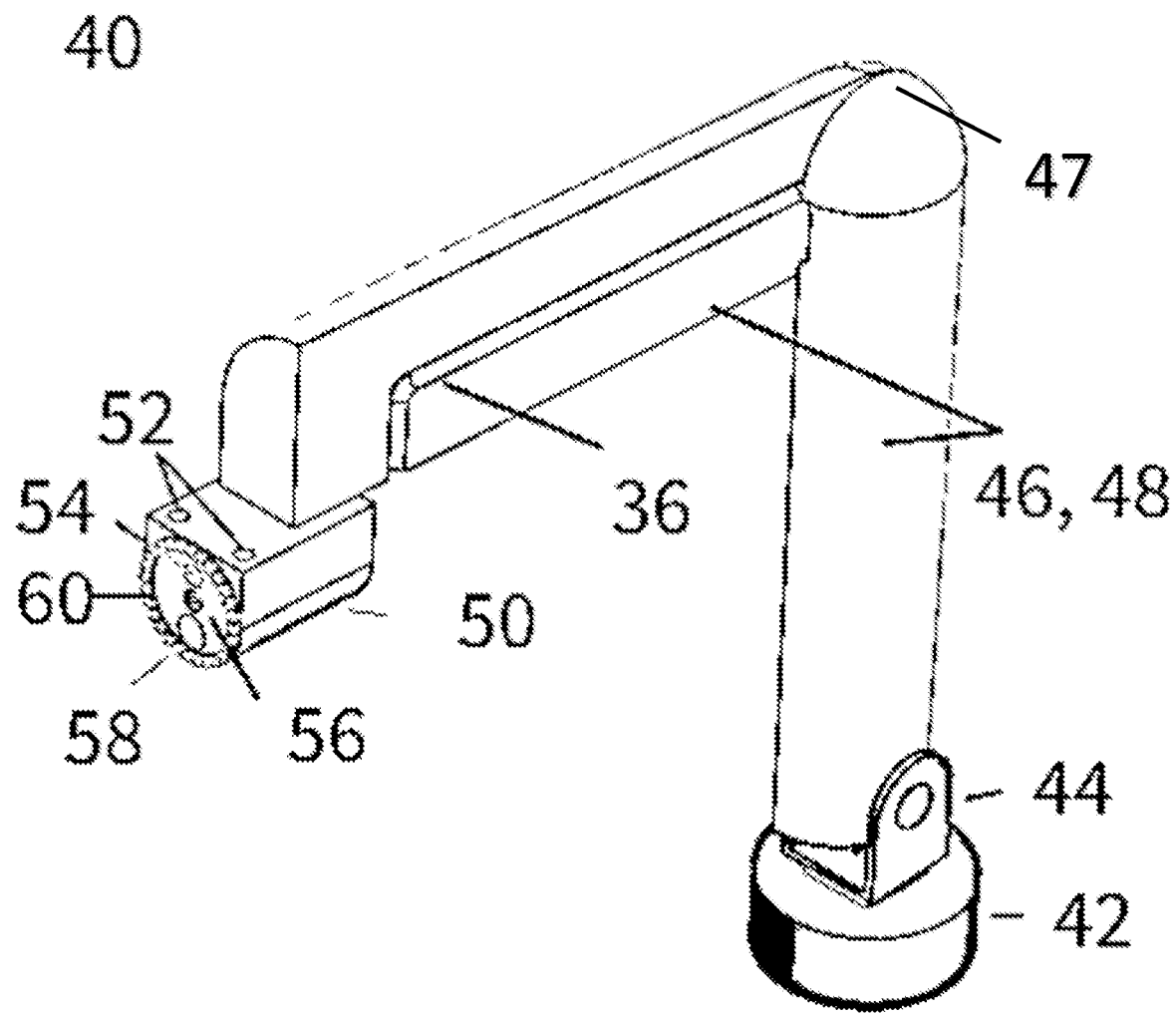
FIG. 4 illustrates an enlarged perspective view of various components of a robotic arm of the automated makeup application system of FIG. 2, in accordance with one implementation of the present disclosure.
Figure 5:
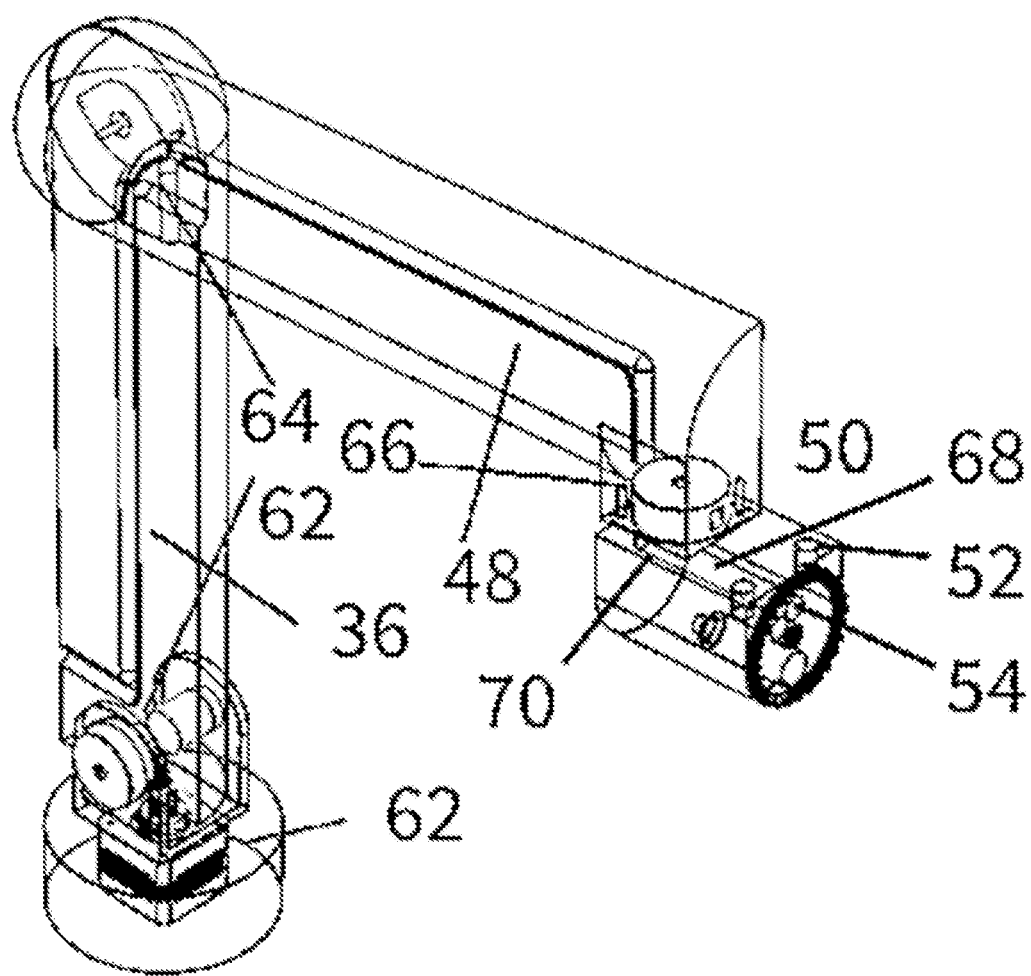
FIG. 5 illustrates a perspective view of the interior motors and hose of the robotic arm of FIG. 4, in accordance with one implementation of the present disclosure.

Referring now to FIG. 4, a perspective view of robotic arm 40, and FIG. 5, a distinct perspective view depicting both the internal and external components of robotic arm 40. In one implementation of the present disclosure, robotic arm 40 is coupled to the floor of casing 10 with a bracket 44 which is coupled to the top of a base 42, as shown in FIG. 4. The robotic arm 40 houses several other components and helps with several processes, including face mapping and makeup application. In one implementation of the present disclosure, robotic arm 40 comprises of two sub-components; arm 46 and arm 48. Arm 46 which is topped off with a domed structure 47, is coupled to bracket 44 and can stand vertically and parallel to the sides of casing 10 when instructed. Another arm 48 is coupled to the domed structure 47 of arm 46 and runs horizontally and parallel to the floor of casing 10. Airbrush compressor hose 36 runs along the length of arms 46 and 48. One end of arm 48 is coupled to a head 50 which houses several other components. A plurality of reservoirs 52 are situated towards the top of head 50. A plurality of nozzles 54, a camera 56, and a photoelectric sensor 58 are located inside the head 50 so as to be visible on the surface of head 50 that faces away from the robotic arm; and that face of head 50 is bordered by a plurality of lights 60. The reservoirs 52 store makeup formula delivered by pump 18; moreover, the formula is mixed inside the reservoirs 52 through back-bubbling. The nozzles 54 are used to spray formula to the user's face. The camera 56 is used to record the images of the face, which then sends the images to the phone in real time. The photoelectric sensor 58 is used to determine the distance to, absence, or presence of an object with the aid of a light transmitter. A servo-motor 62 is housed inside base 42, as shown in FIG. 5. That motor can rotate arm 46 up to 360° when required. Several other servo-motors are also illustrated; servo-motor 64 sits inside the domed structure 47 connecting arm 46 and arm 48 and can rotate arm 48 in an upward or downward direction when required; and, servo-motor 66 is located at the far end of arm 48 and sits on top of head 50. Airbrush compressor hose 36 is shown to run along the length of arms 46 and 48. The head 50 further encloses a plurality of reservoirs 52, a plurality of nozzles 54, a plurality of needles 68, and a plurality of plug triggers 70. The plug triggers 70 are coupled to the needles 68 and work together to control the rate which makeup formula is sprayed. The plug triggers 70 move the needles 68 to allow makeup formula to be sprayed through the nozzles 54 when required and to completely block the nozzle airway and cease spraying.

Figure 6:
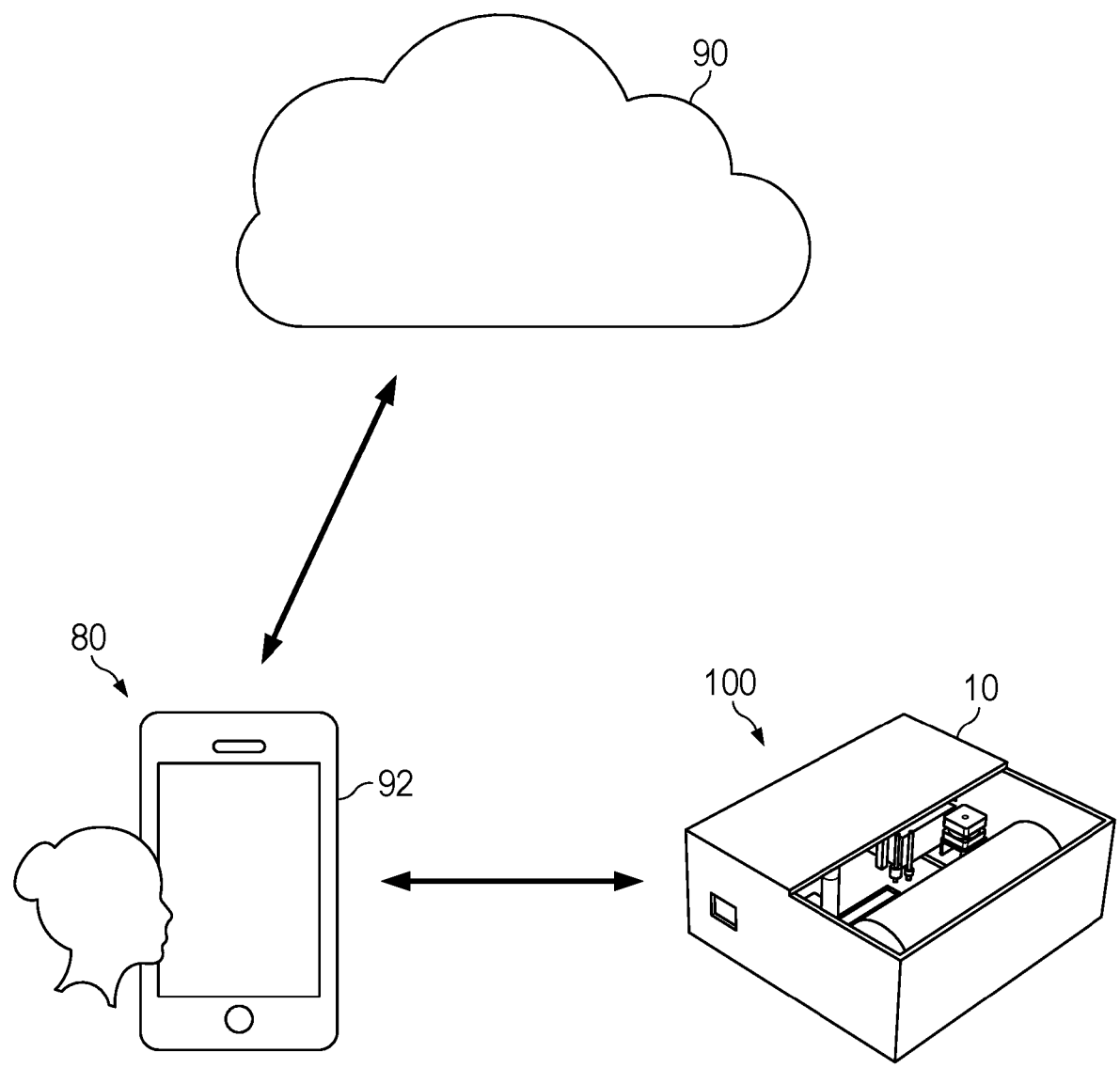
FIG. 6 illustrates a diagram of an assembly for controlling the automated makeup application system of FIG. 2 with user data, in accordance with one implementation of the present disclosure.

Referring to FIG. 6, in operation, the user's first interaction with the automated makeup application system 100 is through a computer application, which can be accessed via mobile phone 92, personal digital equipment, notebook, laptop, tablet computer, desktop computer, and/or an equivalent. A first-time user registers in the computer application 80 and a returning user logs into the computer application 80. All user data, which may comprise logins, face map, skin tone, color and style preferences, are stored in a virtual server database (database) 90 which is, in one implementation, hosted in the cloud. Apart from user data, preconfigured looks and data for color combinations are also stored on the database 90.

Figure 7A:
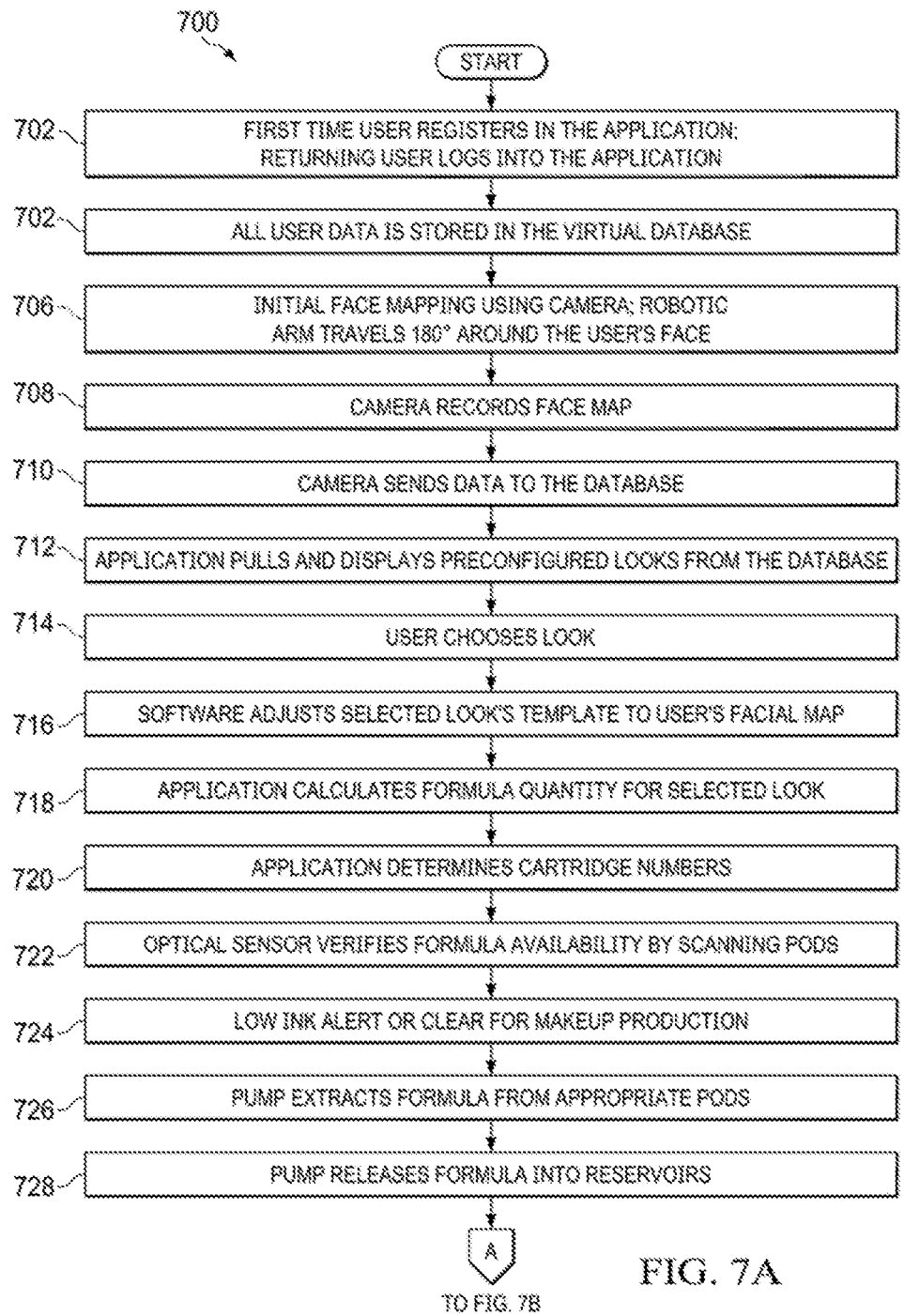
FIG. 7A and FIG. 7B illustrate a flowchart of a method for automated makeup application, in accordance with one implementation of the present disclosure.
Figure 7B:
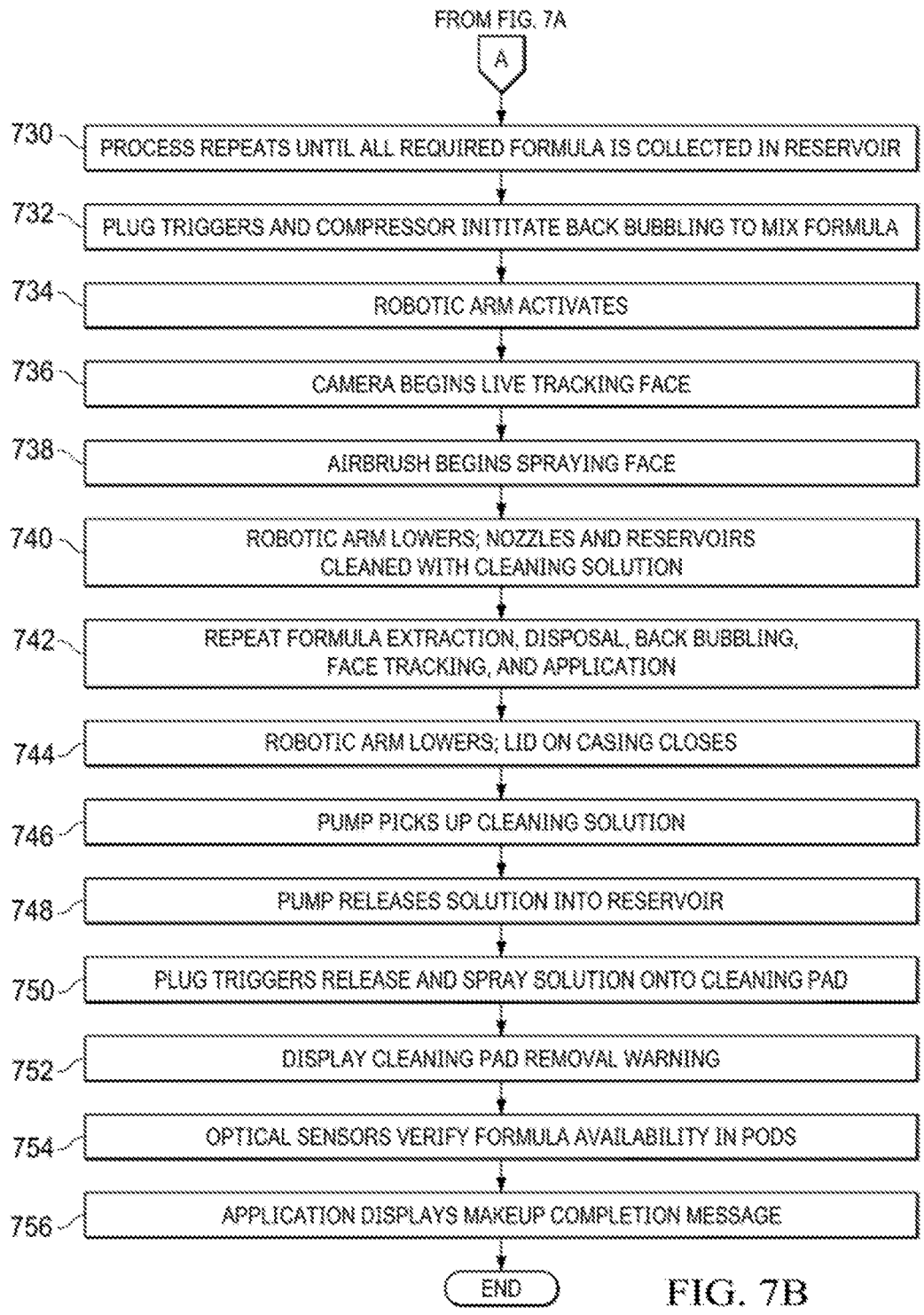

Referring to FIG. 7A and FIG. 7B, one implementation of a method 700 for automatically applying makeup is schematically depicted. The method 700 begins on FIG. 7A with step 702 during which a first-time user registers in the computer application, or a returning user logs into the computer application. In step 704, all user data is stored in the virtual database. In step 706, the user initiates the face mapping process in the computer application. Subsequently, the microcontroller 34 signals the robotic arm 40 to initiate operation to record the user's face map, skin tone, and lip color. The camera 56 mounted on the robotic arm 40, begins mapping the user's face as the robotic arm 40 travels 180° around the user's face, moving to get a full-frontal view, then moving to one side for a side view, and to the other side of the face for another side view. In step 708, the camera 56 records a face map along with the user's skin tone and lip color. In step 710, the camera 56 sends that data to the database.

In step 712, the computer application pulls preconfigured looks from the database and displays them to the user. In step 714, the user chooses a look. In step 716, a virtual face recognition software residing on the database adjusts the selected look's facial template to the user's facial map and skin tone. In step 718, the computer application then calculates the formula quantity required for a plurality of makeup categories, including but not limited to; foundation, contouring, blush, highlighter, eyeshadow, eyeshadow highlighter, eyeliner, and lip color. The computer application also calculates how much the pump 18 needs to pump to obtain the quantity of each item needed. In step 720, the computer application determines which cartridge numbers the pump 18 needs to move, the distance from its initial position to the appropriate pod 16, and the distance from the pod 16 back to the appropriate reservoir 52 to release the formula.

In step 722, with the calculations completed, the microcontroller 34 signals the optical sensor 20 to verify formula availability. Running along track 26 with the aid of timing pulleys 22 and belt clamp 24, optical sensor 20 scans the appropriate pods 16 to check formula availability. In step 724, when optical sensor 20 determines there isn't enough formula, the system triggers a low ink alert message, which is displayed by the application on the user's screen. Also, in step 724, when optical sensor 20 determines there is enough formula, the system will clear makeup production. In step 726, the pump 18 extracts formula from the appropriate pods 16. In more detail, microcontroller 34 then signals timing pulleys 22 and belt clamp 24 to move pump 18 to the appropriate pod 16. Pump 18 lowers its syringe into the pod 16 and triggers its pump to extract the precise quantity of formula from the pod 16. In step 728, the pump 18 releases the formula into appropriate reservoirs 52. In more detail, pump 18 rotates away from pod 16 after extracting the formula and moves over to the head 50 of the robotic arm 40 and releases the formula into the appropriate reservoir 52. The illustration of method 700 continues on FIG. 7B. In step 730, pump 18 then rotates back over the appropriate pod 16, lowers syringe, extracts formula, rotates back over the appropriate reservoir 52, and releases the formula. The process is repeated until all required formulas is collected into corresponding reservoirs 52. After all required formulas are deposited into corresponding reservoir 52, microcontroller 34 signals airbrush compressor 28 to initiate operation.

In step 732, on the head 50 of the robotic arm 40, plug triggers 70 plug the airbrush system to back bubble the formula in order to mix each formula together to obtain the desired color. In step 734, microcontroller 34 signals robotic arm 40 to activate by raising to its standing, neutral position with the aid of servo-motor 62. In step 736, the camera 56 begins live tracking the user's face. In more detail, microcontroller 34 signals camera 56 to begin live tracking of the user's face and signals the robotic arm 40 to move to its initial position in front of the user's face. In step 738, the airbrush begins spraying the user's face. Specifically, microcontroller 34 signals plug triggers 70 to release the first airbrush nozzle 54 and begin spraying the user's face with formula. The system continues to track the location of robotic arm 40 in relation to the user's face, keeping the correct distance away from the face as robotic arm 40 moves, mimicking a pre-programmed human hand fashion.

In step 740, microcontroller 34 signals robotic arm 40 to rotate back down to its starting position next to the floor of casing 10. Reservoirs 52 and nozzles 54 are cleaned and disposed onto the cleaning pad 30 with cleaning solution. In step 742, the process of formula extraction, disposal, back bubbling, face tracking, and application accomplished in steps 726 through 740 is repeated for each makeup category.

In step 744, once the full face of makeup has been applied and all actions have been completed, the microcontroller 34 signals the robotic arm 40 to rotate back down to its starting position next to the floor of casing 10 and the lid on casing 10 is signaled to close. In step 746, microcontroller 34 signals pump 18 to pick up cleaning solution from its corresponding pod 16. In more detail, running along track 26 with the aid of timing pulleys 22 and belt clamp 24, pump 18 lowers its syringe into pod 16, and triggers its pump to extract the precise quantity of cleaning solution from pod 16. In step 748, pump 18 rotates away from pod 16 after extracting the cleaning solution and moves over to the head 50 of robotic arm 40 and releases the cleaning solution into the appropriate reservoir 52. In step 750, the process of back bubbling occurs again, and then microcontroller 34 signals the plug triggers 70 to release and spray the solution through the airbrush nozzles 54, on to the cleaning pad 30. In step 752, after a pre-determined amount of uses, microcontroller 34 notifies the user that the cleaning pad 30 should be removed and replaced.

In step 754, once all processes are completed, microcontroller 34 signals optical sensor 20 to verify formula availability. In more detail, running along track 26 with the aid of timing pulleys 22 and belt clamp 24, optical sensor 20 scans the appropriate pods 16 to check formula availability. Where Optical sensor 20 determines there isn't enough formula, the system triggers a low ink message which is displayed by the computer application on the user's screen and prompts the user to replace the appropriate formula cartridge. Finally, in step 756, microcontroller 34 triggers a makeup completion message which is displayed by the computer application on the user's screen.

What is claimed:

1. A method for automated makeup application, the method comprising the steps of:
 recording a face map and facial colors of a user;
 selecting a desired look from a plurality of preconfigured looks;
 calculating a formula quantity of a formula needed for each makeup category of the selected look; collecting and releasing the formula with a pump into a reservoir;
 mixing the formula; and
 spraying the user's face with the formula through an airbrush nozzle; and cleaning the reservoir and nozzles,
 wherein calculating the formula quantity needed for each makeup category comprises:
  identifying a color needed to obtain a desired shade;
  identifying a formula cartridge containing the identified color, wherein the formula cartridge is a pod with a top;
  calculating a quantity of formula required to obtain the desired shade;
  calculating a distance from the pump's initial position to the pod; and
  calculating the distance from the pod to the reservoir where the formula will be released.

2. The method of claim 1, wherein recording the face map and facial colors of the user comprises activating a robotic arm with a microcontroller, where said robotic arm is coupled with a camera.

3. The method of claim 2, further comprising: activating the camera with the microcontroller; and signaling the robotic arm to travel around the user's face, wherein the camera is operable to record a frontal view, a left-side view, and a right-side view of the user's face.

4. The method of claim 1, wherein recording the face map comprises recording a dataset including facial features, borders, crevices, curvature, skin tone, and lip color, and assembling a virtual model of the user's face based on the dataset.

5. The method of claim 1, further comprising storing the user's face map and facial colors on a virtual server database.

6. The method of claim 1, wherein the calculating steps are performed by a computer application.

7. The method of claim 1, wherein the computer application returns the calculated data to a database.

8. The method of claim 1, further comprising:
 scanning the pod with an optical sensor to check formula availability;
 triggering a low ink message after determining there is insufficient formula, wherein the message is displayed by a computer application on a user's screen;
 clearing makeup production after determining there is sufficient formula; and moving the pump to the appropriate pod for formula extraction.

9. The method of claim 1, wherein collecting and releasing the formula with the pump into the reservoir comprises:
 lowering a syringe of the pump into the pod, wherein the pump is triggered to extract the calculated quantity of formula from the pod;
 raising the syringe out of the pod to a resting point; moving the pump to the reservoirs; and
 releasing the formula from the pump into the reservoir.

10. The method of claim 1, wherein mixing the formula comprises: directing a microcontroller to initiate an airbrush compressor; and
 mixing the formula with the airbrush compressor to obtain a desired color.

11. The method of claim 1, wherein spraying the user's face with formula through the airbrush nozzle comprises:
 directing a microcontroller to initiate an airbrush compressor; and
 mixing the formula with the airbrush compressor to obtain a desired color.

12. The method of claim 11, further comprising sending a makeup completion message after all makeup categories have been applied, wherein said message is displayed by the computer application on the user's screen.

13. The method of claim 1, wherein spraying the user's face with formula through the airbrush nozzle comprises:
 signaling a robotic arm to raise to a standing, neutral position using servo-motors;
 initiating a camera on the robotic arm, wherein the camera sends live tracking of the user's face to the computer application, and the system continuously maps the face with face mapping software;
 signaling the robotic arm to move in front of the user's face; signaling the camera to begin live tracking the user's face;
 releasing a first airbrush nozzle and spraying the user's face with formula;
 tracking the location of the robotic arm in relation to the user's face, wherein the robotic arm is pre-programmed to keep an appropriate distance from the user's face as it moves;
 repeating the application process for other makeup categories;
 initiating an optical sensor to verify formula levels after all makeup applications have been completed, wherein the optical sensor scans appropriate pods to check formula levels; and
 triggering a low ink message after determining formula levels are below a pre-determined quantity, wherein the message is displayed by a computer application on a user's screen.

14. The method of claim 1, wherein cleaning the reservoir and nozzle comprises:
 lowering the robotic arm to initial resting position;
 signaling pump to obtain cleaning solution from a pod and move to the robotic arm;
 releasing cleaning solution into the reservoir;
 back-bubbling the cleaning solution to clean the reservoir and nozzle; signaling a plurality of plug triggers to eject the cleaning solution; and releasing the cleaning solution onto a cleaning pad.

15. A system operable to perform automated makeup application, said system comprising:
 a computer application having a graphical user interface allowing a user to access the system, select a desired makeup style from a plurality of preconfigured looks, and apply the selected makeup style to the user's face;
 a virtual server database having virtual face recognition software allowing the system to store user data, the preconfigured looks, and data for color combinations associated with the preconfigured looks; and a makeup application box comprising hardware allowing the system to record a face map and facial colors of the user, store a makeup formula, collect and release the formula into a reservoir, mix the formula to make a desired color, spray the user's face with the formula using an airbrush nozzle, and clean the reservoir and nozzle, wherein the hardware comprises:
   a removable formula sleeve comprising a plurality of pods to store makeup formula;
a removable cleaning pad;
   a pump having a syringe used for extracting formula and powered by a servo-motor, wherein said pump is coupled to an optical sensor which scans pods for available formula;
   a plurality of timing pulleys which move the pump and the optical sensor along a formula rack;
   a microcontroller;
   an air brush compressor connected to a robotic arm via an airbrush compressor hose, said robotic arm having a plurality of smaller arms and coupled to a base which houses a servo-motor used to rotate the robotic arm; and
   a head coupled to one of the plurality of smaller arms, the head housing a plurality of reservoirs for storing formula, a plurality of nozzles for spraying formula, a plurality of needles and triggers to aid mixing and releasing formula, a camera for face-mapping, a photoelectric sensor to aid face-mapping, and a plurality of lights.

16. The automated makeup application system of claim 15, wherein the computer application is accessed via one of the following devices: a mobile phone, a personal digital equipment, a notebook computer, a laptop, a tablet computer, and a desktop computer.

17. The automated makeup application system of claim 15,
   wherein the virtual server database is hosted on one of the following: the internet, and a stand-alone server connected to the system by wired or wireless technology.

18. A method for automated makeup application, the method comprising the steps of:
   recording a face map and facial colors of a user;
   selecting a desired look from a plurality of preconfigured looks;
   calculating a formula quantity of a formula needed for each makeup category of the selected look; collecting and releasing the formula with a pump into a reservoir;
   mixing the formula; and
   spraying the user's face with the formula through an airbrush nozzle; and
   cleaning the reservoir and nozzles,
   wherein collecting and releasing the formula with the pump into the reservoir comprises:
      lowering a syringe of the pump into the pod, wherein the pump is triggered to extract the calculated quantity of formula from the pod;
      raising the syringe out of the pod to a resting point; moving the pump to the reservoirs; and
      releasing the formula from the pump into the reservoir.

19. A method for automated makeup application, the method comprising the steps of:
   recording a face map and facial colors of a user;
   selecting a desired look from a plurality of preconfigured looks;
   calculating a formula quantity of a formula needed for each makeup category of the selected look; collecting and releasing the formula with a pump into a reservoir;
   mixing the formula; and
   spraying the user's face with the formula through an airbrush nozzle; and
   cleaning the reservoir and nozzles,
   wherein mixing the formula comprises:
      directing a microcontroller to initiate an airbrush compressor; and
      mixing the formula with the airbrush compressor to obtain a desired color.

20. A method for automated makeup application, the method comprising the steps of:
   recording a face map and facial colors of a user;
   selecting a desired look from a plurality of preconfigured looks;
   calculating a formula quantity of a formula needed for each makeup category of the selected look; collecting and releasing the formula with a pump into a reservoir;
   mixing the formula; and
   spraying the user's face with the formula through an airbrush nozzle; and
   cleaning the reservoir and nozzles,
   wherein spraying the user's face with formula through the airbrush nozzle comprises:
      directing a microcontroller to initiate an airbrush compressor; and
      mixing the formula with the airbrush compressor to obtain a desired color.

21. A method for automated makeup application, the method comprising the steps of:
   recording a face map and facial colors of a user;
   selecting a desired look from a plurality of preconfigured looks;
   calculating a formula quantity of a formula needed for each makeup category of the selected look; collecting and releasing the formula with a pump into a reservoir;
   mixing the formula; and
   spraying the user's face with the formula through an airbrush nozzle; and
   cleaning the reservoir and nozzles,
   wherein spraying the user's face with formula through the airbrush nozzle comprises:
      signaling a robotic arm to raise to a standing, neutral position using servo-motors; initiating a camera on the robotic arm, wherein the camera sends live tracking of the user's face to the computer application, and the system continuously maps the face with face mapping software;
      signaling the robotic arm to move in front of the user's face; signaling the camera to begin live tracking the user's face;
      releasing a first airbrush nozzle and spraying the user's face with formula;
      tracking the location of the robotic arm in relation to the user's face, wherein the robotic arm is pre-programmed to keep an appropriate distance from the user's face as it moves;
      repeating the application process for other makeup categories;
      initiating an optical sensor to verify formula levels after all makeup applications have been completed, wherein the optical sensor scans appropriate pods to check formula levels; and triggering a low ink message after determining formula levels are below a pre-determined quantity, wherein the message is displayed by a computer application on a user's screen.

22. A method for automated makeup application, the method comprising the steps of:

recording a face map and facial colors of a user;

selecting a desired look from a plurality of preconfigured looks;

calculating a formula quantity of a formula needed for each makeup category of the selected look; collecting and releasing the formula with a pump into a reservoir;

mixing the formula; and spraying the user's face with the formula through an airbrush nozzle; and cleaning the reservoir and nozzles, wherein cleaning the reservoir and nozzle comprises:
  lowering the robotic arm to initial resting position;
  signaling pump to obtain cleaning solution from a pod and move to the robotic arm; releasing cleaning solution into the reservoir;
  back-bubbling the cleaning solution to clean the reservoir and nozzle; signaling a plurality of plug triggers to eject the cleaning solution; and releasing the cleaning solution onto a cleaning pad.

* * * * *